United States Patent [19]

Huffman

[11] 4,448,439
[45] May 15, 1984

[54] SAFETY TRAILER HITCH

[76] Inventor: Edgar J. Huffman, 210 S. Broadway, St. John, Kans. 67576

[21] Appl. No.: 365,371

[22] Filed: Apr. 5, 1982

[51] Int. Cl.³ .............................................. B60D 1/04
[52] U.S. Cl. .................................................. 280/504
[58] Field of Search .............. 280/477, 504, 514, 507, 280/515, 495, 506; 213/75 R; D12/162

[56] References Cited

U.S. PATENT DOCUMENTS 2,591,487  4/1952  Wirz ..................................... 280/504
3,588,145  6/1971  Thompson ........................... 280/506

FOREIGN PATENT DOCUMENTS 891799  7/1949  Fed. Rep. of Germany ...... 280/477

Primary Examiner—John A. Pekar
Attorney, Agent, or Firm—Edwin H. Crabtree

[57] ABSTRACT

A safety trailer hitch for mounting on the bumper of a vehicle or the like. The hitch characterized by having a mounting bracket with a hook base and a "J" shaped hook extending outwardly and upwardly therefrom. The hook adapted for receiving the end of a tongue of a trailer therearound. The top of the "J" shaped hook having a threaded end portion for receiving a threaded bolt thereon to prevent the tongue from being disengaged from the hitch when the hitch is used for pulling a trailer therebehind.

6 Claims, 3 Drawing Figures

SAFETY TRAILER HITCH

BACKGROUND OF THE INVENTION

This invention relates broadly to a trailer hitch for mounting on the bumper of a vehicle or the like and more particularly but not by way of limitation to a safety hitch adapted for receiving the tongue of a trailer having a tongue eye therein.

Heretofore, there have been various types of trailer hitches and two hooks as described in U.S. Pat. No. 1,411,230 to Weber, U.S. Pat. No. 1,824,843 to Staley, U.S. Pat. No. 2,086,414 to Greble, U.S. Pat. No. 2,207,006 to Harvey, U.S. Pat. No. 2,239,320 to Haniquet and U.S. Pat. No. 2,491,143 to Weiss. None of the above patents describe the unique features and advantages of the subject trailer hitch as described herein.

SUMMARY OF THE INVENTION

The subject invention is rugged in construction, simple in design and is readily adaptable for mounting on various types of vehicles and farm machinery for pulling a trailer therebehind.

The hitch is designed for safety in preventing a trailer from coming loose when it is pulled behind a vehicle.

The trailer hitch further is used for engaging the tongue of a trailer having a tongue eye therethrough. The tongue of the trailer can be quickly received on the trailer hitch and disengaged when the trailer is no longer used.

The trailer hitch includes a hook base attached to the front of a mounting bracket. A "J" shaped hook having a bottom integrally formed in the hook base extends outwardly and upwardly from the base. The top of the hook has a threaded end portion for receiving a threaded nut. The "J" shaped hook is adapted for receiving the tongue of the trailer therearound. The threaded nut is then attached to the top of the hook to prevent the tongue of the trailer from being released when the trailer is being pulled.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
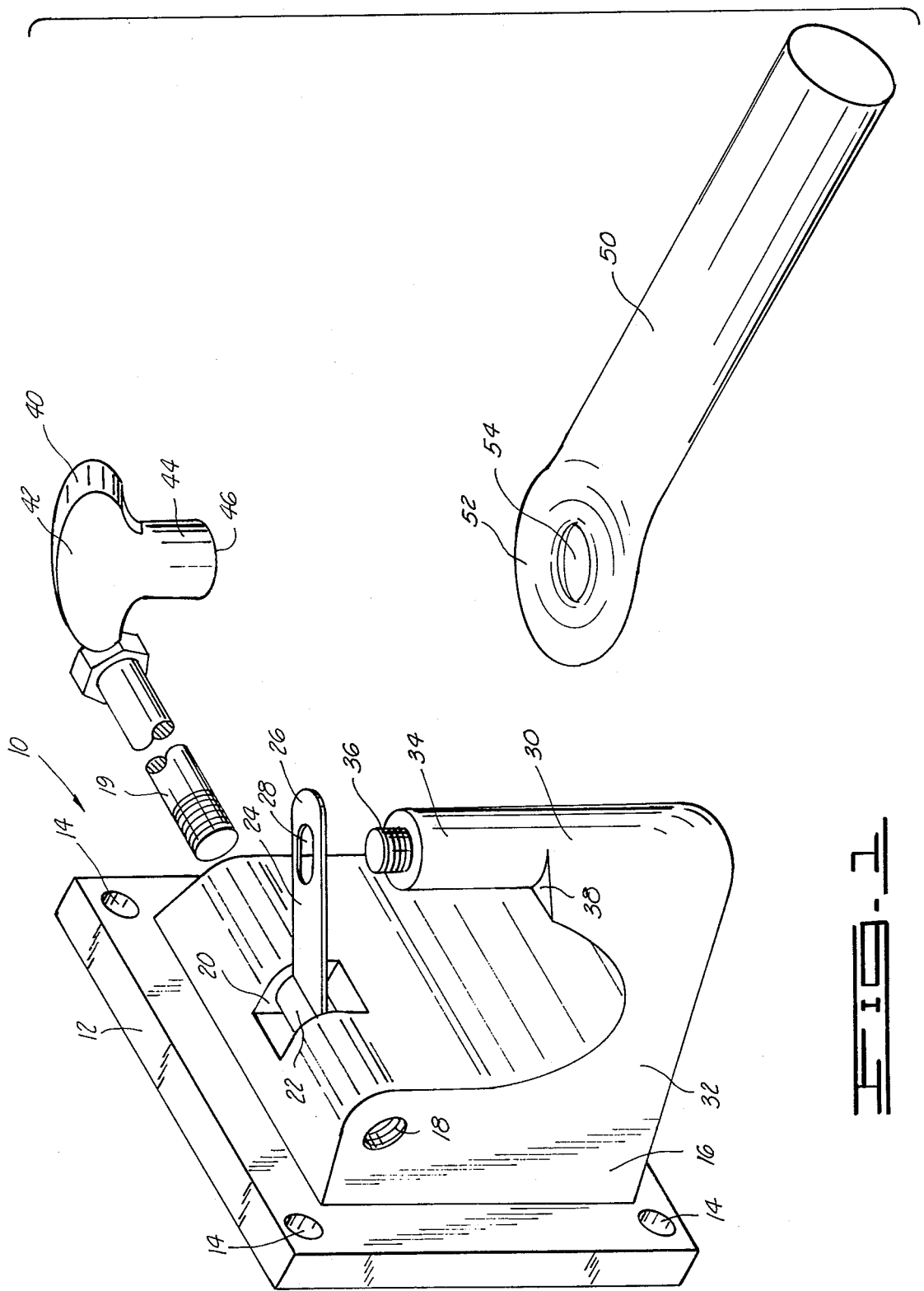
FIG. 1 is a perspective view of the trailer hitch with a portion of the trailer tongue shown.

In FIG. 1 the trailer hitch is shown in a perspective view and designated by general reference numeral 10. The hitch 10 includes a flat angular mounting bracket 12 having apertures 14 therein for receiving bolts for attaching the hitch 10 to the bumper of a vehicle or the like. The bolts in the bumper are not shown in the drawings.

Attached to the front of the mounting bracket 10 is a hook base 16 having a bore 18 drilled through the side thereof for receiving a hook base bolt 19. The front of the hook base 16 includes a cavity 20 centered therein for receiving a first end portion 22 of a flapper 24. The first end portion 22 is looped around the bolt 19 when it is inserted through the bore 18. This provides means for the flapper 24 to pivot on the hook base 16. A second end portion 26 includes an aperture 28 therethrough.

A "J" shaped hook 30 having a bottom portion 32 is integrally formed in the bottom of the hook base 16. The hook 30 extends outwardly and upwardly having a top portion 34 with a threaded end 36. Also in the top portion 34 are a pair of shoulders 38 on opposite sides of the top portion 34. These shoulders can be seen more clearly in FIG. 3.

A threaded nut 40 engages the hook 30 and includes an enlarged nut head 42 with a neck 44 extending downwardly therefrom. The neck 44 has a threaded bore 46 therein. The bore 46 can be seen more clearly in dotted lines in FIG. 2.

When the trailer hitch 10 is in use, a trailer tongue 50 having an end portion 52 with a tongue eye 54 therethrough is dimensioned for receipt around the top portion 34 of the hook 30. The end portion 52 of the tongue 50 rests on top of the shoulders 38. The flapper 24 is then lowered with the threaded end portion 36 received through the aperture 28 of the flapper 22. The nut 40 with the threaded bore 46 is threaded onto the threaded end 36 thus securing the trailer tongue 50 to the trailer hitch 10.

Figure 2:
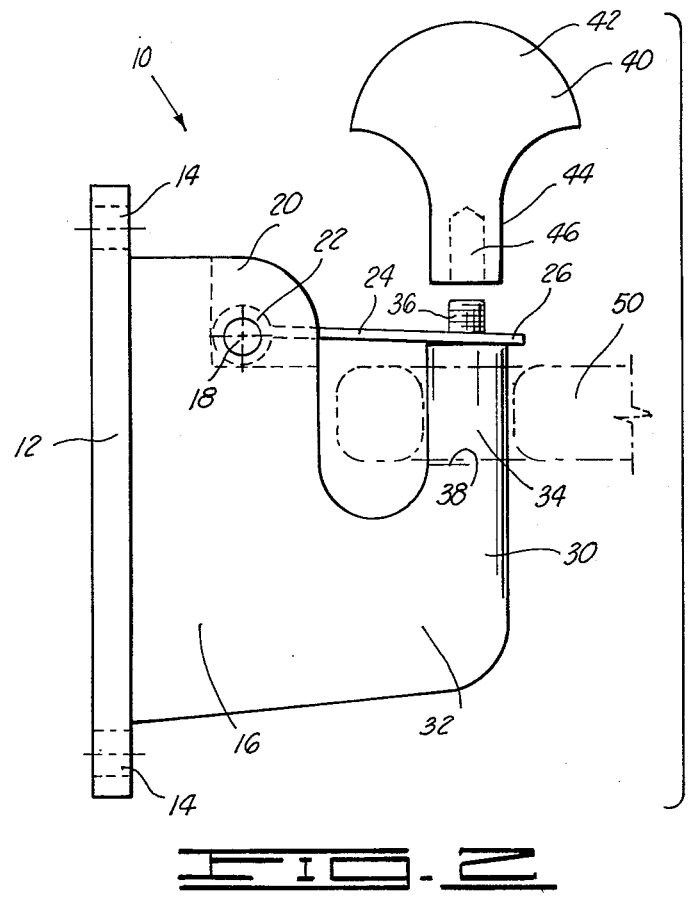
FIG. 2 is a side view of the tailer hitch.

In FIG. 2 a portion of the tongue 50 can be seen in dotted lines with the "J" shaped hook 30 inserted through the tongue eye 54. The flapper 24 has now been lowered with the threaded end 36 inserted through the aperture 28. The threaded nut 40 is disposed thereabove and ready for connection to the hook 30 thus securing the tongue 50 in place. The end portion 52 of the tongue 50 rests on the shoulders 38 with the flapper 24 preventing upward movement of the tongue 50 against the threaded bolt 40 to insure the nut 40 does not come loose when the trailer is pulled behind the vehicle. By this the flapper 24 prevents the tongue 50 from contacting the nut 40 and working or vibrating loose the nut 40 as the trailer is pulled behind the vehicle. Also seen in this view is the bore 18 through the side of the hook base 16 with the first end portion 22 of the flapper 24 received around the bore 18 ready for receipt of the bolt 19 therethrough.

Figure 3:
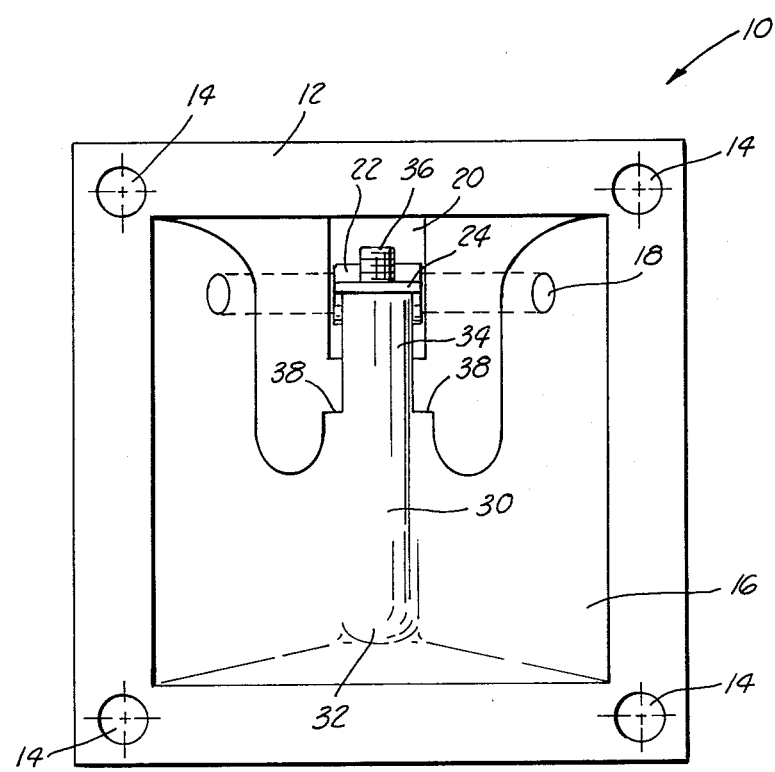
FIG. 3 is a front view of the trailer hitch.

In FIG. 3 a front view of the trailer hitch 10 can be seen showing the lower portion 32 of the hook 30 integrally formed in the hook base 16 with the shoulders 38 disposed on opposite sides of the top portion 34 of the "J" shaped hook 30. Also, seen in this view, is the cavity 20 formed in the front of the hook base 16 for receiving the first end portion 22 of the flapper 24.

From reviewing the above detailed description it can be appreciated that the structure of the trailer hitch 10 is rugged in design and readily adapatable for safely pulling heavy trailer loads where the trailer includes a tongue similar to the tongue 50 having the tongue eye 54 adapted for receipt around the "J" shaped hook 30.

Changes may be made in the construction and arrangement of the parts or elements of the embodiments as described herein without departing from the spirit or scope of the invention defined in the following claims.

What is claimed is:

1. A trailer hitch for mounting on the bumper of a vehicle or the like, the hitch adapted for receiving the tongue of the trailer, the tongue having a tongue eye. the hitch comprising:

a mounting bracket adapted for attachment to the bumper;

a hook base attached to the front of the mounting bracket;

"J" shaped hook, the bottom of the hook integrally formed in the hook base, the hook extending outwardly and upwardly therefrom, the top of the hook having a threaded end, the hook dimensioned for receipt through the eye of the tongue when the tongue is placed therearound;

a threaded nut threadably attached to the threaded end of the top of the hook to prevent the tongue from being removed from the hitch when the trailer is pulled therebetween; and a flapper, one end of the flapper pivotally mounted on the hook base, the other end of the flapper having an aperture, the threaded end in the top of the hook received through the aperture in the flapper, the threaded nut securing the flapper in place, the flapper adapted for preventing the tongue from contacting the threaded nut when the vehicle is pulling the trailer therebehind.

2. The hitch as described in claim 1 wherein the hook base includes a bore drilled through the side thereof for receiving a hook base bolt therein and pivotally securing the flapper to the hook base.

3. The trailer hitch as described in claim 1 wherein the threaded nut includes an enlarged nut head and a neck extending therefrom, the neck having a threaded bore therein for securing the nut to the threaded end of the top of the hook.

4. The hitch as described in claim 1 wherein the mounting bracket includes apertures therethrough for receiving mounting bolts for attaching the hitch to the bumper of the vehicle.

5. The hitch as described in claim 1 wherein the "J" shaped hook includes shoulders below the top of the threaded end of the hook, the shoulders adapted for resting the end of the tongue thereon when the tongue is received around the "J" shaped hook.

6. A trailer hitch for mounting on the bumper of a vehicle or the like, the hitch adapted for receiving the tongue of the trailer, the tongue having a tongue eye, the hitch comprising:

a mounting bracket having apertures therein, the apertures adapted for receiving bolts therethrough for securing the mounting bracket to the bumper of the vehicle;

a hook base attached to the front of the mounting bracket;

a "J" shaped hook, the bottom of the hook integrally formed in the hook base, the hook extending outwardly and upwardly therefrom, the top of the hook having a threaded end, the hook dimensioned for receipt through the eye of the tongue when the tongue is placed therearound, below the top of the hook are formed shoulders on both sides thereof, the shoulders adapted for receiving the end of the tongue thereon;

a threaded nut having an enlarged head thereon and a neck extending downwardly therefrom, the neck having a threaded bore therein and adapted for attachment to the threaded end of the top of the hook to prevent the tongue from being removed from the hitch when the trailer is being pulled; and a flapper, one end of the flapper pivotally mounted on the hook base, the other end of the flapper having an aperture, the threaded end in the top of the hook received through the aperture in the flapper, the threaded nut securing the flapper in place, the flapper adapted for preventing the tongue from contacting the threaded nut when the vehicle is pulling the trailer therebehind.

* * * * *